(12) United States Patent
Satoh

(10) Patent No.: US 7,336,470 B2
(45) Date of Patent: Feb. 26, 2008

(54) SOLENOID DRIVE APPARATUS AND DRIVE METHOD

(75) Inventor: Kiyokatsu Satoh, Saitama (JP)

(73) Assignee: Sanken Electric Co., Ltd. (JP)

( * ) Notice: Subject to any disclaimer, the term of this patent is extended or adjusted under 35 U.S.C. 154(b) by 64 days.

(21) Appl. No.: 10/475,064

(22) PCT Filed: Apr. 22, 2002

(86) PCT No.: PCT/JP02/03981

§ 371 (c)(1),
(2), (4) Date: Oct. 17, 2003

(87) PCT Pub. No.: WO02/086919

PCT Pub. Date: Oct. 31, 2002

(65) Prior Publication Data

US 2004/0120094 A1 Jun. 24, 2004

(30) Foreign Application Priority Data

Apr. 20, 2001 (JP) .............................. 2001-123462

(51) Int. Cl.
*H01H 9/00* (2006.01)

(52) U.S. Cl. .................. 361/160; 361/152; 361/154; 361/159; 361/166

(58) Field of Classification Search ........ 361/159–160, 361/152–154, 187, 93.1–93.2, 139, 166, 361/194, 206; 303/119.2, 119.3, 115.2, 152, 303/156

See application file for complete search history.

(56) References Cited

U.S. PATENT DOCUMENTS 4,017,765 A * 4/1977 Maisch ..................... 361/88
5,818,178 A * 10/1998 Marumoto et al. ......... 318/254
6,322,166 B1 * 11/2001 Furuya et al. ........... 303/119.2

FOREIGN PATENT DOCUMENTS

| JP | 52-107524 | 9/1977 |
|---|---|---|
| JP | 63-242192 | 10/1988 |
| JP | 63-242192 A | 10/1988 |
| JP | 02-123988 | 5/1990 |
| JP | 03-177668 A | 8/1991 |
| JP | 04-050550 A | 2/1992 |
| JP | 08-240277 A | 9/1996 |
| JP | 09-045865 | 2/1997 |
| JP | 09-045865 A | 2/1997 |
| JP | 2001-023819 | 1/2001 |
| JP | 2001-023819 A | 1/2001 |

* cited by examiner

*Primary Examiner*—Michael Sherry
*Assistant Examiner*—Terrence R. Willoughby
(74) *Attorney, Agent, or Firm*—Townsend and Townsend and Crew

(57) ABSTRACT

A solenoid (30) has one end connected to the ground G and the other end connected to an N-MOS transistor (33) which applies current from a battery (31) to the solenoid (30). On the other hand, regenerative current generated when the N-MOS transistor turns off flows from a diode (34) whose anode is connected to the ground, via a resistor (32) to the solenoid (30). Accordingly, without connecting the anode of the diode (34) to the solenoid (30) using a lead line, the solenoid (30) can be driven by current. Moreover, since the current flowing from the battery (31) to the solenoid (30) does not flow to the resistor (32), heating is reduced and a solenoid drive apparatus can be made in an IC.

12 Claims, 6 Drawing Sheets

SOLENOID DRIVE APPARATUS AND DRIVE METHOD

TECHNICAL FIELD

The present invention relates to a solenoid drive device and a solenoid drive method for driving a solenoid incorporated in a car, a ship, etc. by flowing an electric current through the solenoid.

BACKGROUND ART

Recent cars are equipped with an electronic control apparatus. The electronic control apparatus includes a solenoid drive device for driving a solenoid. For example, an automatic transmission car (automatic car) is equipped with a solenoid for controlling the oil pressure for gear change, and a solenoid drive device for driving the solenoid by flowing an electric current therethrough. For example, Unexamined Japanese Patent Application KOKAI Publication No. H3-177668, Unexamined Japanese Patent Application KOKAI Publication No. H4-50550, or Unexamined Japanese Patent application KOKAI Publication No. H8-240277 discloses a technique relating to a solenoid drive device mounted on a car, etc. The present invention incorporates the contents of these documents into the present specification by reference.

A conventional solenoid drive device has the following problems.

The control circuit, etc. of a solenoid drive device is usually contained in a control unit. However, the solenoid is set at a location apart from the control unit. Therefore, it is necessary to connect the control unit and the solenoid to each other with a plurality of leads. In a case where a plurality of solenoids are driven, and in a case where the distance between the solenoid and the control unit is long, etc., the amount of wire harnesses becomes large.

The control circuit detects an electric current flowing through the solenoid and uses it for feedback control for, for example, optimizing the electric current flowing through the solenoid and turning off the electric current. The direction and value of a solenoid current abruptly changes. Because of this, the control circuit performs its processes by detecting an electric current flowing through the solenoid and using an output signal obtained by averaging the detected value. However, even if an electric current flowing through the solenoid abruptly changes, an output signal of a smoothing circuit does not follow the change and thus is delayed. Therefore, when an output signal of the smoothing circuit is used for control of the driving of the solenoid, there is a fear that a high-speed control can not be obtained.

Further, in order to detect the value of an electric current flowing through the solenoid, generally, a resistor having a small resistance value is connected to the solenoid, and a voltage drop at this resistor is detected. Because an electric current from a power source and a regenerative current flow through this resistor, electricity loss is large, and the amount of heat generated is large. Because of this, this resistor can not be built on a monolithic IC (Integrated Circuit), which hinders reduction of the number of components and miniaturization of the solenoid drive device.

DISCLOSURE OF INVENTION

It is an object of the present invention to provide a solenoid drive device in which the amount of wire harnesses can be reduced, and the number of components can be reduced, or which can be miniaturized.

Further, it is an object of the present invention to provide a solenoid drive device having a high response speed.

To achieve the above objects, a solenoid drive device according to the present invention comprises:

a solenoid whose one end is connected to a ground;

a switching element which is connected between the other end of the solenoid and a power source, and switches on/off a current path between the solenoid and the power source;

a regenerative circuit which is connected between the ground and the other end of the solenoid, and flows a current caused by a counterelectromotive force generated at the solenoid when the switching element is switched off; and a current detection circuit which detects a level of a current flowing through the regenerative circuit, and generates a current detection signal corresponding to the detected level.

The regenerative circuit comprises, for example, a flywheel diode and a resistor which is connected to the flywheel diode, and the current detection circuit samples a voltage drop caused at the resistor by a current flowing through the resistor, and holds and outputs the sampled voltage. In this case, the regenerative circuit comprises a flywheel diode whose anode is connected to a ground, and a resistor whose one end is connected to a cathode of the flywheel diode and whose other end is connected to the switching element and the one end of the solenoid.

The ground comprises frame grounds which are mutually connected via a frame of a device such as a body of a car, etc. on which a solenoid is set.

The current detection circuit may further comprise a sample hold circuit which carries out sampling of the current detection signal when the switching element is switched off, and holds the sampled signal as a signal representing a current flowing through the solenoid in a period during which the switching element is switched on and in a period during which the switching element is switched off. The solenoid drive device may further comprise a computing circuit which sets, based on a length of a period during which the switching element is switched on, a timing at which the switching element should carry out the sampling immediately after this period.

A control circuit which controls a timing for switching on/off the switching element based on a detection signal of the current detection circuit, may be prepared. In this case, the control circuit may repeat a cycle constituted by switching on and switching off of the current path by the switching element, the current detection circuit may detect a level of a regenerative current in each cycle, and the control circuit may control switching on and switching off of the switching element in a next cycle, by using the detected level.

A pulse width control circuit which adjusts a length of a period during which the switching element is switched on or a period during which the switching element is switched off based on a detection signal of the current detection circuit, a duty ratio control circuit which adjusts a ratio of a period during which the switching element is switched on and a period during which the switching element is switched off based on a detection signal of the current detection circuit, and a frequency control circuit which adjusts a frequency of switching on and switching off of the switching element, etc. may be prepared.

For example, the switching element (33, SW), a regenerative circuit (34, 32, 61), and a current detection circuit (35, 36, 62) are incorporated into a monolithic IC having a ground terminal.

A solenoid drive device according to a second aspect of the present invention comprises:

a frame (51) which is constituted by a conductive material;

a plurality of solenoids (30) one end of each of which is connected to the frame commonly;

a plurality of switches (33) each of which is connected between the other end of each of the solenoids and a power source, and switches on/off a current path between a corresponding solenoid and the power source;

a plurality of regenerative circuits (34, 32) each of which is connected between the frame and the other end of each of the solenoids, and flows a current caused by a counterelectromotive force generated at the corresponding solenoid when each of the switching element is switched off; and a current detection circuit (35, 36) which detects a level of the current flowing through the regenerative circuits, and generates a current detection signal corresponding to the detected level.

A solenoid drive method according to a third aspect of the present invention comprises:

connecting one end of each of a plurality of solenoids to a frame ground so as to be common;

supplying each solenoid with a current from a power source by switching on/off a current path between the other end of each of the solenoids and the power source;

circulating a regenerative current caused by a counter-electromotive force generated at each the solenoid through a circulation circuit; and detecting a level of the current flowing through the circulation circuit, and using the level for controlling of switching on/off of the current path.

In this case, switching on and off of the current path may be repeated, a level of the regenerative current may be detected at a timing at which the current path is switched off, and the detected level of the regenerative current may be used for controlling of a next switching on and off.

BEST MODE FOR CARRYING OUT THE INVENTION

Figure 1:
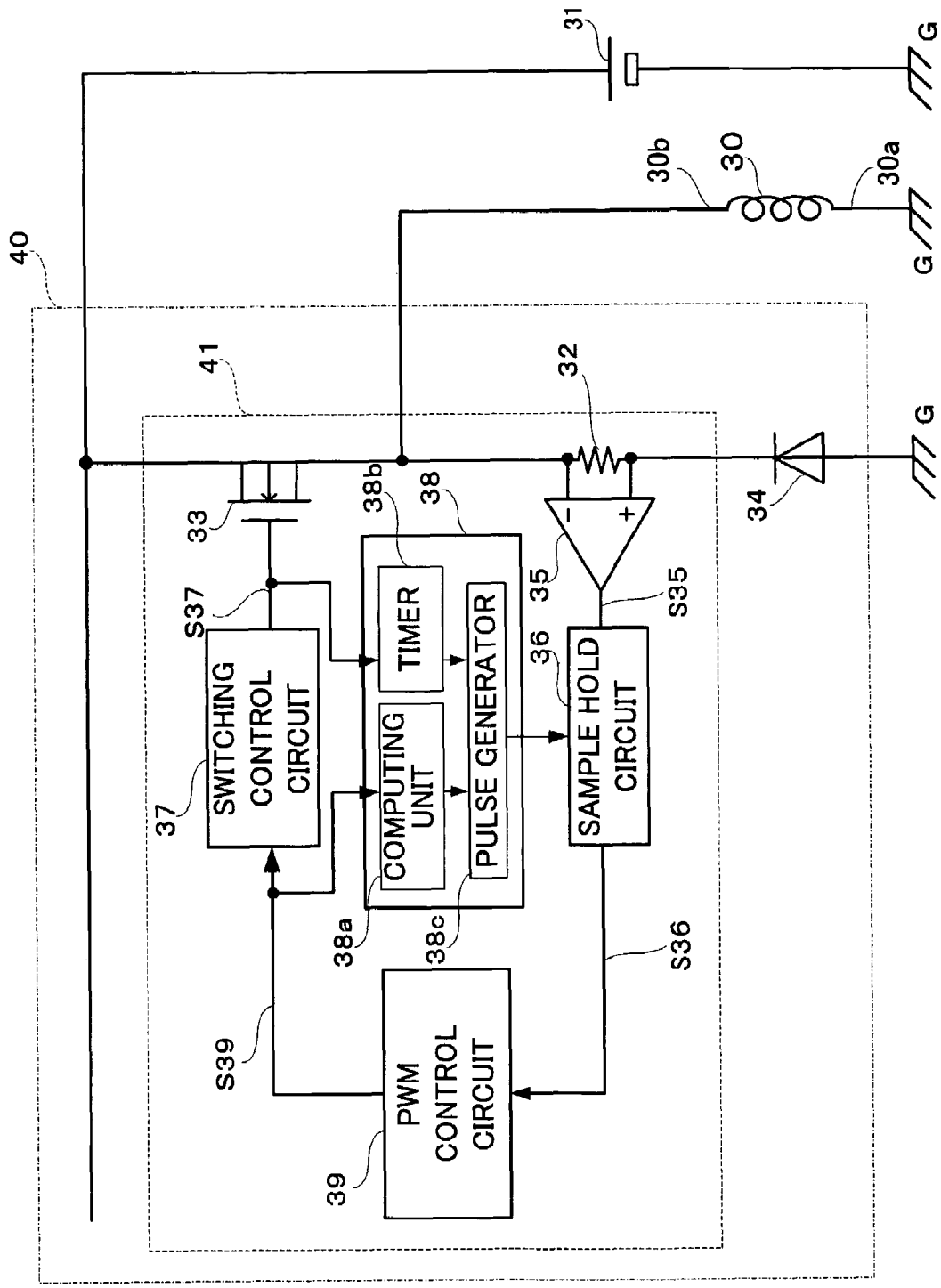
FIG. 1 is a structural diagram of a solenoid drive device according to an embodiment of the present invention.

FIG. 1 is a structural diagram showing a solenoid drive device according to an embodiment of the present invention.

This solenoid drive device drives a solenoid 30, which is incorporated in, for example, a solenoid-controlled valve, by flowing an electric current through the solenoid 30 while monitoring the electric current. The solenoid drive device comprises a battery 31, a resistor 32, an N channel metal oxide insulation film semiconductor (N-MOS transistor) 33, a diode 34, an amplifier 35, a sample hold circuit 36, a switching control circuit 37, a computing circuit 38, and a PWM control circuit 39.

The battery 31 is a drive power source of the solenoid 30, and its negative electrode is connected to a ground G.

One end 30a of the solenoid 30 is connected to the ground G. The ground G is, for example, a frame ground, or a conductive frame or body of a car or an arbitrary electric or electronic apparatus.

The other end 30b of the solenoid 30 is connected to one end of the resistor 32 and a source of the N-MOS transistor 33. A cathode of the diode 34 is connected to the other end of the resistor 32. This diode is a flywheel diode that flows a regenerative current of the solenoid 30. An anode of the diode 34 is connected to the ground G. A drain of the N-MOS transistor 33 is connected to a positive electrode of the battery 31.

A negative phase input terminal (−) of the amplifier 35 is connected to the connection node of the other terminal 30b of the solenoid 30 and the one terminal of the resistor 32, and a positive phase input terminal (+) of the amplifier 35 is connected to the connection node of the cathode of the diode 34 and the other end of the resistor 32.

The sample hold terminal 36 that samples and holds an output signal of the amplifier 35 is connected to an output terminal of the amplifier 35. The switching control circuit 37 that generates a switching control signal S37 for controlling turning on/off of the N-MOS transistor 33 is connected to a gate of the N-MOS transistor 33.

The computing circuit 38 that sets a sampling timing of the sample hold circuit 36 is connected to the switching control circuit 37.

The resistor 32, the N-MOS transistor 33, the amplifier 35, the switching control circuit 37, the computing circuit 38, and the sample hold circuit 36 are built on a monolithic IC 41 inside a control unit 40. Inside the control unit (solenoid drive circuit) 40, the diode 34 is further contained.

Figure 2:
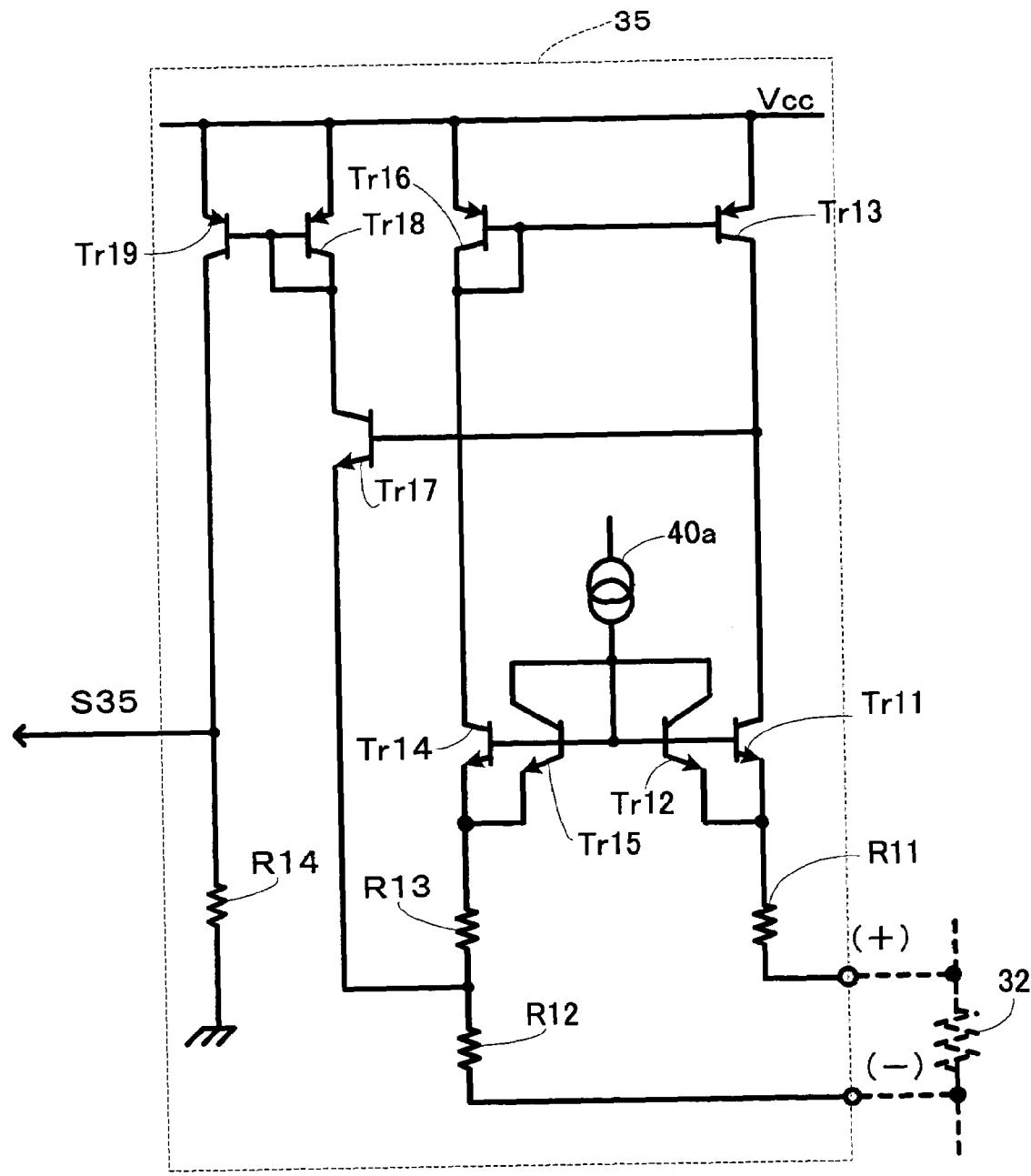
FIG. 2 is a circuit diagram of an amplifier in FIG. 1.

FIG. 2 is a circuit diagram showing an example of a structure of the amplifier 35 in FIG. 1.

The amplifier 35 comprises a resistor R11 whose one end is connected to the positive phase input terminal (+) of the amplifier 35, a resistor R12 whose one end is connected to the negative phase input terminal (−) thereof, and a resistor R13 whose one end is connected to the other end of the resistor R12.

The emitter of an NPN type transistor Tr11 and an emitter of an NPN type transistor Tr12 are connected to the other end of the resistor R11. A collector of the transistor Tr11 is connected to a collector of a PNP type transistor Tr13. An emitter of the transistor Tr13 is connected to a power source. A base of the transistor Tr11, and a collector and base of the transistor Tr12 are connected to a constant current source 40a.

On the other hand, an emitter of an NPN type transistor Tr14 and an emitter of a PNP type transistor Tr15 are connected to the other end of the resistor R13. A collector and base of a PNP type transistor Tr16 are connected to the collector of the transistor Tr14. The base of the transistor Tr16 is connected to a base of the transistor Tr13, and an emitter of the transistor Tr16 is connected to a power source. A base of the transistor Tr14 and a base and collector of the transistor Tr15 are connected to the constant current source 40a.

A base of an NPN type transistor Tr17 is connected to a connection node of the collector of the transistor Tr13 and the collector of the transistor Tr11. An emitter of the transistor Tr17 is connected to a connection node of the resistor R12 and the resistor R13, and a collector of the transistor Tr17 is connected to a collector and base of a PNP type transistor Tr18 and a base of a PNP type transistor Tr19. Emitters of the transistor Tr18 and transistor Tr19 are commonly connected to a power source. The transistor Tr19 forms a current mirror circuit of the transistor Tr18, and a collector of the transistor Tr19 is connected via a resistor 14 to a ground. A connection node of the resistor R14 and the collector of the transistor Tr19 is the output terminal of the amplifier 35.

Figure 3:
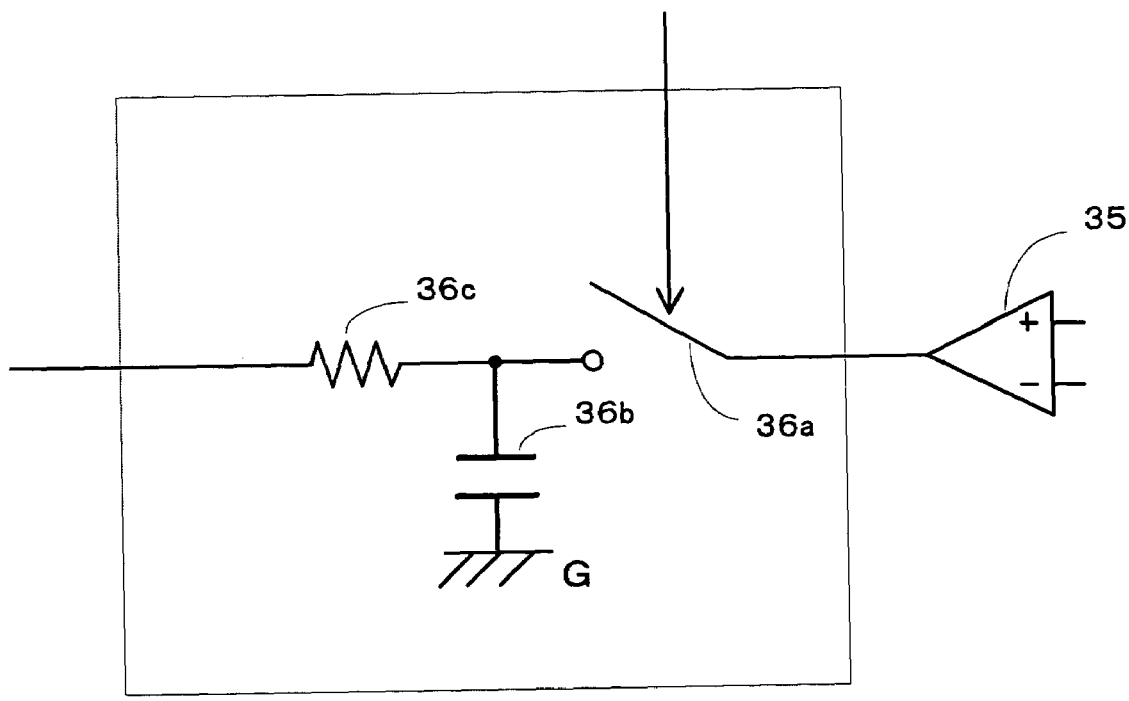
FIG. 3 is a circuit diagram of principal parts of a sample hold circuit in FIG. 1.

The sample hold circuit 36 in FIG. 1 comprises, as shown in FIG. 3, a switch 36a whose one end is connected to the output terminal of the amplifier 35, and a condenser 36b whose one electrode is connected to the other end of the switch 36a. The condenser 36b samples and holds an output voltage S35 of the amplifier 35. The other electrode of the condenser 36b is connected to the ground G. One end of resistor 36c is connected to a connection node of the one electrode of the condenser 36b and the switch 36a. The switch 36a is switched on/off in accordance with a sampling clock signal S38 supplied from the computing circuit 38, thereby connecting/isolating the condenser 36b and the output terminal of the amplifier 35 to and from each other.

The switching control circuit 37 in FIG. 1 supplies a switching control signal (pulse signal) S37 having a duty ratio instructed by the PWM control circuit 39 to the gate of the N-MOS transistor 33 and the computing circuit 38, at a pre-designated predetermined cycle.

The computing circuit 38 shown in FIG. 1 comprises a computing unit 38a, a timer 38b, a pulse generator 38c, etc. The computing unit 38a calculates a timing P at which a pulse of a sampling clock signal S38 should be generated, by an equation (1), in a case where it is assumed that a period during which the switching control signal S37 output by the switching control circuit 37 is at a H (high) level is t, and a period of one cycle made up of the H level and a L (low) level is T.

$$P=(T-t)/2+t \quad (1)$$

The timer 38b is reset when the switching control signal S37 rises from the L level to the H level, and clocks time.

The pulse generator 38c outputs a pulse of the sampling clock signal S38, when the time clocked by the timer 38b corresponds to a time measured by the computing unit 38a.

Due to this, the sample hold circuit 36 samples and outputs an output voltage S35 of the amplifier 35 at a timing which is at a center of a period during which the N-MOS transistor 33 is turned off, regardless of the duty ratio of the switching control signal S37.

The PWM control circuit 39 in FIG. 1 supplies the switching control circuit 37 with a duty ratio control signal S39 for controlling the duty ratio of an output signal of the switching control circuit 37 in a way that the current level (value) of a sampling signal (regenerative current (circulating current flowing through the resistor 32)) which is output by the sample hold circuit 36 will be constant. A method of controlling/adjusting the duty ratio is arbitrary, and an ordinarily-known arbitrary controlling method, such as P (proportion) control, P·I (proportion·integration) control, P·I·D (proportion·integration ·differentiation) control, etc. may be employed. For example, in case of P control, the PWM control circuit 39 outputs to the switching control circuit 37, a duty ratio control signal S39 for instructing that the duty ratio R of the switching control signal S37 output by the switching control circuit 37 should be multiplied by R·k·Ir/(Ir+ΔI), in a case where a current level Id sampled by the sample hold circuit 36 is greater than a reference level Ir by ΔI. Note that the duty ratio is represented by R=$T_H$/T. Here, T represents the cycle of the switching control signal S37, and $T_H$ represents a period during which the signal is at a high level in each one cycle T. Further, it is also acceptable that the duty ratio R is decreased by a predetermined value ΔR in the case where the detected current level Id is greater than the reference level Ir, and the duty ratio R is increased by the predetermined value ΔR in a case where the current level Id is smaller than the reference level Ir.

Next, an operation of the solenoid drive device having the above-described structure will be explained with reference to FIG. 4(a) to FIG. 4(f).

(1) First, it is assumed that the operation of the solenoid drive device shown in FIG. 1 is stable (is in a stable state).

Figure 4:
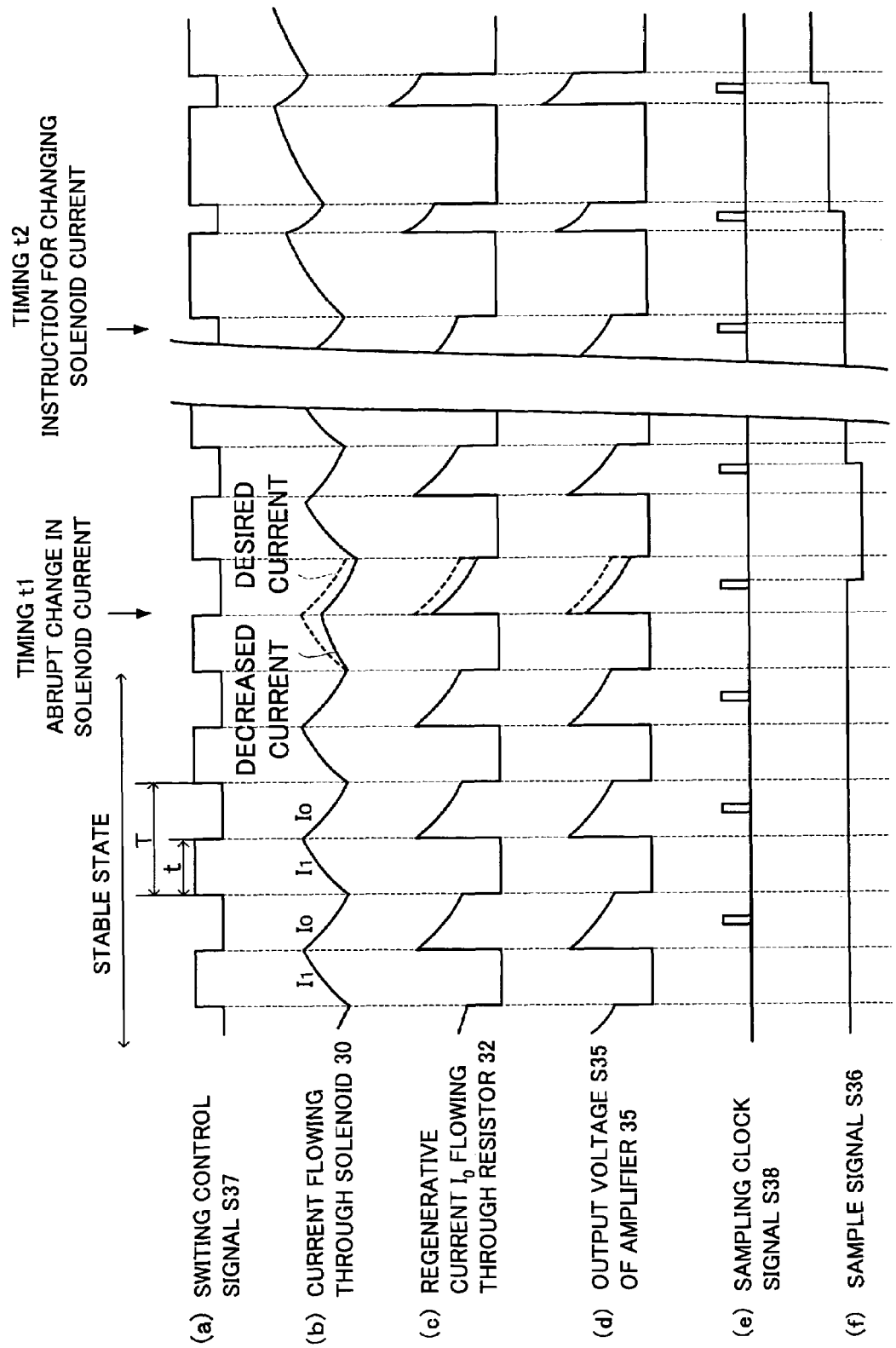
FIGS. 4(a) to (f) are waveform diagrams for explaining an operation of the solenoid drive device in FIG. 1.

The switching control circuit 37 supplies the gate of the N-MOS transistor 33 with the switching control signal S37 which repeats a high (H) level and a low (L) level alternately as shown in FIG. 4(a). The N-MOS transistor 33 is turned on when the switching control signal S37 is at the H level, thereby connecting the battery 31 and the solenoid 30 to each other. Because of this, a solenoid current $I_1$ shown in FIG. 4(b) flows from the battery 31 to the solenoid 30.

When the switching control signal S37 is at the L level, the N-MOS transistor 33 is turned off and disconnects the solenoid 30 and the battery 31 from each other. When the N-MOS transistor 33 disconnects the solenoid 30 and the battery 31 from each other, the voltage of the other end 30b of the solenoid 30 whose the one end 30a is connected to the ground G is decreased due to a counterelectromotive force, and a forward voltage is applied to the diode 34. The diode 34 to which a forward voltage is applied enters a continuity state, thereby flowing a regenerative current $I_0$ shown in FIG. 4(b) from the ground G into the solenoid 30 via the resistor 32. That is, the diode 34, the resistor 32, and the solenoid 30 forms a closed loop via the ground G. Due to this, the solenoid 30 is driven by the solenoid current $I_1$ and the regenerative current $I_0$.

Only the regenerative current $I_0$ flows through the resistor 32, as shown in FIG. 4(c). When this regenerative current $I_0$ flows through the resistor 32, the positive phase input terminal (+) and negative phase input terminal (−) of the amplifier 35 are at positive voltages, and an input voltage of the positive phase input terminal (+) is higher than an input voltage of the negative phase input terminal (−).

In the amplifier 35, the transistors Tr11 to Tr16 and the constant current source 40a shown in FIG. 2 function as a constant current source circuit, so as to operate in such a way that a current flowing through the resistor R11 and a current flowing through the resistor R13 become equal. For example, in a case where the input voltage of the positive phase input terminal (+) becomes higher than the input voltage of the negative phase input terminal (−) when the regenerative current $I_0$ flows, the voltages of the emitters of the transistor Tr11 and transistor Tr12 become high, and the voltages between the base and emitter of the respective transistor Tr11 and transistor Tr12 are decreased. Due to this, the current flowing through the resistor R11 is going to decrease and the current flowing through the resistor R13 is going to increase. Because of this, the voltage of the collector of the transistor Tr11 starts to increase. Therefore, a voltage between the base and emitter of the transistor Tr17 becomes high, and a current flowing through the transistor Tr17 to the resistor R12 is increased. In response to that the current flowing through the resistor R12 is increased, the voltage of the connection node of the resistor R13 and resistor R12 is increased, and a current flowing through the resistor R13 is decreased. In this way, this constant current source circuit operates so that the currents flowing through the resistor R13 and resistor R11 will be equal.

When the current flowing through the transistor Tr17 is increased, the voltages of the bases of the transistor Tr18 and transistor Tr19 are decreased, and a current of the collector of the transistor Tr19 is increased. Thus, a current flowing through the resistor R14 is increased, and the output voltage S35 of the amplifier 35 is increased. This output voltage S35 of the amplifier 35 is output to the sample hold circuit 36 as shown in FIG. 4(d).

The computing circuit 38 outputs a H level pulse representing a timing at which the sample hold circuit 36 should carry out sampling at a timing indicated by the equation (1) as shown in FIG. 4(e), when the switching control signal S37 output by the switching control circuit 37 is at the L level. When the system on the whole is in a stable state, the sampling clock signal S38 is output in a predetermined cycle.

The switch 36a in the sample hold circuit 36 is switched on in a period during which the sampling clock signal S38 is at the H level, and thereby charges the condenser 36b with the output voltage S35. The condenser 36b charged with the output voltage S35 holds the charged voltage, and outputs it as shown in FIG. 4(f). The resistor 36c prevents the condenser 36b from discharging, thereby preventing the charged voltage from fluctuating. When the system is in a stable state, a sample signal S36 is kept at a constant level, as shown in FIG. 4(f).

This constant level is a level almost equal to the reference level retained by the PWM control circuit 39 thereinside. The PWM control circuit 39 outputs to the switching control circuit 37, such a duty ratio control signal S39 as to keep the duty ratio of the switching control signal S37 output by the switching control circuit 37 as it is.

(2) In a case where the solenoid current changes,

Next, it is assumed that the state of the system changes at a timing $t_1$ due to a certain cause such as a voltage decrease at the battery 31, etc., and thus the solenoid current $I_1$ is decreased from the current value so far which is indicated by a broken line to a level indicated by a solid line as shown in FIG. 4(b).

Then, the regenerative current $I_0$ flowing through the resistor 32 is also decreased as shown in FIG. 4(c), and the voltage drop at the resistor 32 is also decreased as shown in FIG. 4(d).

The sample hold circuit 36 samples an output voltage S35 which is lower than a voltage output by the amplifier 35 before. Therefore, the sample signal S36 output by the sample hold circuit 36 becomes lower in the voltage level than before.

The PWM control circuit 39 compares the voltage level of the sample signals S36 with the reference level thereinside. And because the voltage level of the sample signal S36 is lower, the PWM control circuit 39 outputs a duty ratio control signal S39 for increasing the duty ratio of the switching control signal S37.

In accordance with this duty ratio control signal S39, the switching control circuit 37 outputs a pulse having a duty ratio larger than the duty ratio therebefore (having a longer H level period).

By the duty ratio becoming larger, the rate of the on period t to one cycle T of the N-MOS transistor 33 is increased, and thus a current flowing from the battery 31 to the solenoid 30 is increased. Therefore, the solenoid current $I_1$ is increased.

The computing circuit 38 determines the period T and the H level period t of the equation (1) based on the duty ratio control signal S39 from the PWM control circuit 39, calculates a timing to output a sampling clock signal (pulse signal) S38, and outputs a H level pulse at a timing which is later than a rise edge of the switching control signal S37 by the calculated period P. That is, even if the duty ratio is changed, a sampling pulse is output at the center of a period during which the switching control signal S37 is at the L level and the N-MOS transistor 33 is turned off.

When the sampling clock signal S38 is output from the computing circuit 38 as shown in FIG. 4(d), the switch 36a is switched on to sample the output voltage S35 of the amplifier 35 shown in FIG. 4(c) and hold it in the condenser 36b.

That is, a voltage corresponding to a value of the regenerative current $I_0$ at the center time in the period during which the N-MOS transistor 33 is turned off, i.e. a period during which the regenerative current $I_0$ is flowing, is sampled and held.

Due to this, as shown in FIG. 4(f), the output signal of the sample hold circuit 36 changes within one cycle after the duty ratio is changed.

The PWM control circuit 39 compares the voltage of the sample signal S36 with the inside reference level. If the voltage of the sample signal S36 is higher than the reference voltage, the PWM control circuit 39 outputs a duty ratio control signal S39 for decreasing the duty ratio. If the voltage of the sample signal S36 is lower than the reference voltage, the PWM control circuit 39 outputs a duty ratio control signal S39 for increasing the duty ratio. If the voltage of the sample signal S36 is equal to the reference voltage, the PWM control circuit 39 outputs a duty ratio control circuit 39 outputs a duty ratio control signal S39 for maintaining the duty ratio.

The solenoid current $I_1$ and the regenerative current $I_0$ come back to the original value within several cycles of the switching control signal S37 while such an operation is repeated.

(3) In a case where the control unit 40 is supplied with an instruction that the solenoid current $I_1$ should be increased or decreased, Next, it is assumed that the PWM control circuit 39 is supplied from outside with an instruction signal that the solenoid current $I_1$ should be increased, at a timing $t_2$.

In this case, the PWM control circuit 39 increases the inside reference voltage in accordance with an instructed value. As a result, the PWM control circuit 39 determines that the voltage of the sample signal S36 is lower than the inside reference voltage, and outputs a duty ratio control signal S39 for increasing the duty ratio. Due to this, the duty ratio of the switching control signal S37 is increased, and the solenoid current $I_1$ is increased.

Thus, the voltage of the sample signal S36 output from the sample hold circuit 36 is also increased. The above-described operation for controlling the duty ratio is repeated until the solenoid current $I_1$ reaches the instructed value and the voltage of the sample signal S36 becomes almost equal to the reference voltage.

By controlling the duty ratio of the switching control signal S37, that is, by performing PWM control, it is possible to keep the solenoid current $I_1$ at a predetermined level, or to adjust the solenoid current $I_1$.

An operation of the control unit 40 in a case where the solenoid current $I_1$ is increased by a disturbance is almost equal to the operation explained in the above (2). However, the duty ratio for switching is made smaller. Further, an operation of the control unit 40 in a case where the PWM control circuit 39 is supplied with an instruction that the solenoid current should be decreased from outside, is almost equal to the operation explained in the above (3). However, the duty ratio for switching is made smaller.

The solenoid drive circuit according to the present embodiment has the following advantages.

(1) Because the one end of the solenoid 30 is connected to the ground G, only one lead is necessary for connecting the solenoid 30 and the control unit 40. Therefore, the amount of wire harnesses can be decreased and increase of weight can be suppressed in a case where there are many solenoids 30.

Figure 5:
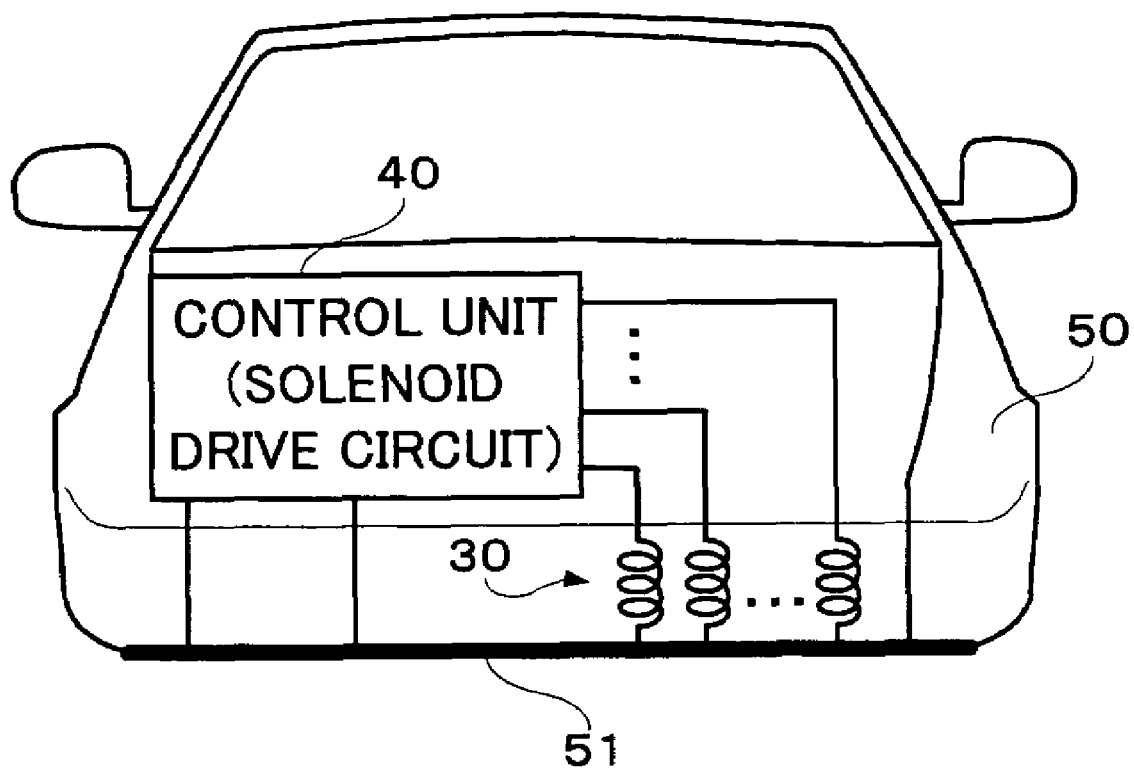
FIG. 5 is a diagram showing an example of a structure of a car on which a plurality of solenoids and a solenoid drive device are disposed.

Accordingly, as shown in FIG. 5, this feature is very effective in a case where, for example, a plurality of solenoids 30 are disposed on a machine or device 50 of a car, a ship, etc. to be apart from a control unit 40, one end of each solenoid 30 is connected to a frame ground 51, and the other end is connected to the solenoid drive circuit 40 via wires.

(2) Because a signal representing the current flowing through the solenoid 30 is sampled and output by the sample hold circuit 36, even if the current flowing through the solenoid changes, it is possible to represent the change quickly. That is, the circuit of a circuit which smoothes and outputs the current flowing through the solenoid.

(3) Because the sample hold circuit 36 samples the output voltage S35 of the amplifier 35 in a period during which the current $I_0$ flows through the resistor 32, it is possible to respond to the current flowing through the solenoid 30 faster than in a case where a smoothing circuit or the like is used.

(4) Because only the regenerative current $I_0$ flows through the resistor 32, the amount of heat generated in the resistor 32 is restricted and electricity loss is small.

(5) Because the amount of heat generated in the resistor 32 is small, it is possible to built the resistor 32 on the monolithic IC 41, which enables reduction in the number of components on the solenoid drive device and miniaturization of the solenoid drive device.

(6) Because the timing at which the sample hold circuit 36 should carry out sampling is set based on a period during which the N-MOS transistor 33 is turned on, the output signal of the sample hold circuit 36 can follow a change in the current flowing through the solenoid 30 fast. This improves the accuracy for performing PWM control.

The present invention is not limited to the above-described embodiment, but can be modified variously.

For example, in the above-described embodiment, the N-MOS transistor 33 is used as a switch for switching the solenoid current. However, other semiconductor switches such as a P-MOS transistor, a bipolar transistor, a thyristor, etc., and furthermore, a relay are employable. Further, the voltage drop at the resistor 32 is detected as a method for detecting the regenerative current of the solenoid 30. However, the method for detecting the regenerative current is arbitrary. For example, the resistor 32 may be connected between the ground and the anode of the flywheel diode 34, and a voltage drop at this resistor 32 may be detected. Further, a current flowing through the flywheel diode 34 may be detected by using a current transformer.

The timing to output a H level pulse to be output by the computing circuit 38 is not limited to the timing represented by the equation (1). Further, the output timing and/or a pulse width may be changed.

Further, for example, the sampling clock signal S38 to be supplied to the sample hold circuit 36 may not be generated by the computing circuit 38, but may be supplied from outside. The timing of sampling (the timing at which the sampling clock signal S38 is output) may be variable. By making the sampling timing variable, it becomes possible to monitor the current flowing through the solenoid 30 at a timing suitable for a specific purpose. Accordingly, it also becomes possible to observe the maximum value of the current flowing through the solenoid 30, observe the minimum value thereof, and observe the average value, for example.

Further, as described above, the method for controlling the duty ratio is arbitrary. Therefore, P control, PI control, and PID control, etc. may be performed based on a deviation e between the reference level retained inside the PWM control circuit 39 and the voltage of the sample signal S36 output by the sample hold circuit 36.

Further, the current of the solenoid 30 is controlled by PWM (pulse width modulation) of switching. However, a switching frequency may be controlled. In this case, a frequency control circuit may be prepared instead of the PWM control circuit 39, so that the frequency of the switching control signal S37 output by the switching control circuit 37 will be controlled in accordance with the output from the sample hold circuit 36.

Figure 6:
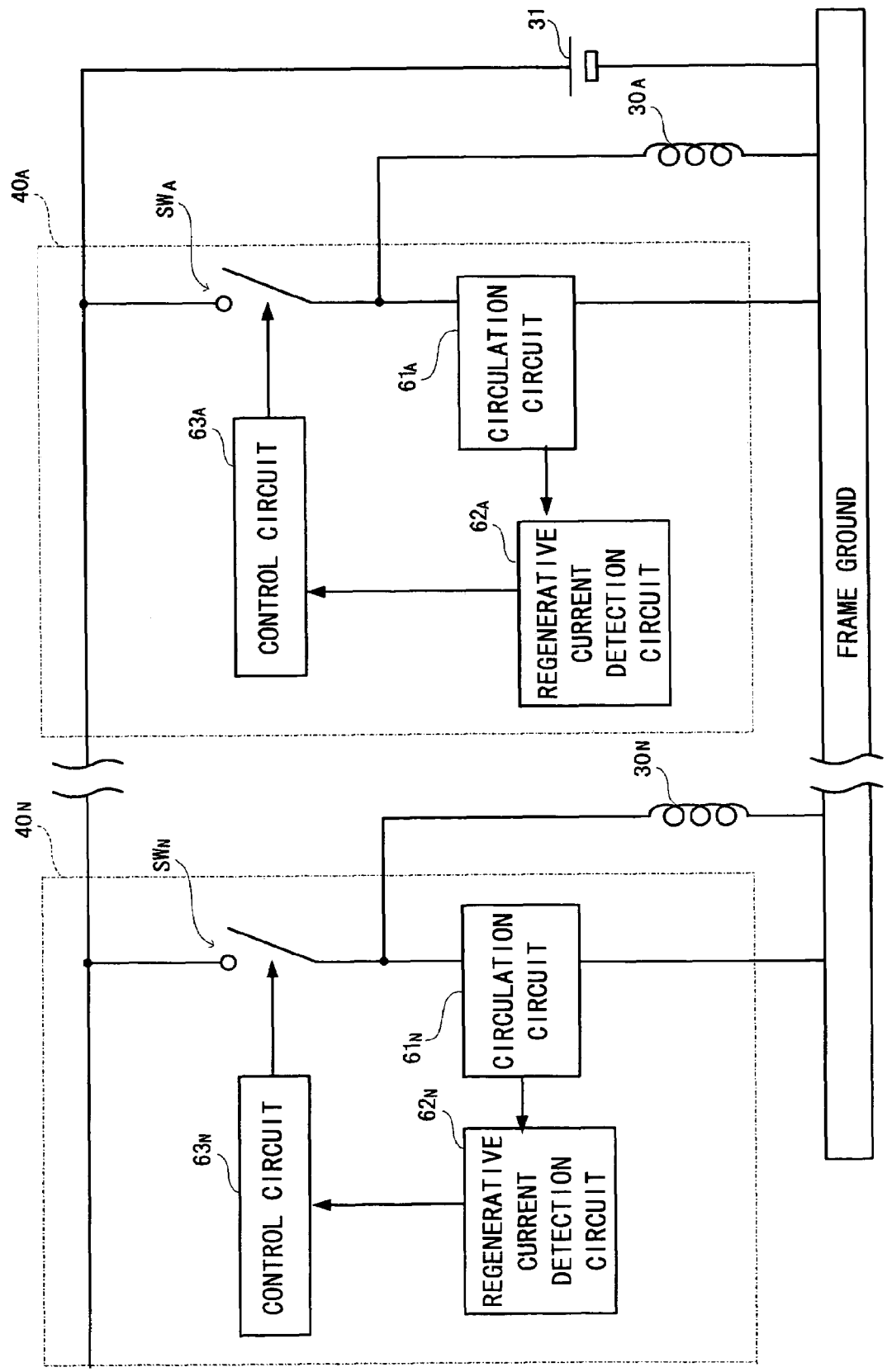
FIG. 6 is a diagram showing a modified example of the solenoid drive device according to the embodiment of the present invention.

In sum, the present invention can be widely applied to a solenoid drive circuit, which, as shown in FIG. 6, 1) supplies a current from a battery 31 to one or a plurality of solenoids 30 ($30_A$ to $30_N$) by carrying out switching at switches SW ($SW_A$ to $SW_N$) in accordance with a control signal, 2) flows a regenerative current of the solenoids 30 ($30_A$ to $30_N$) via circulation circuits 61 ($61_A$ to $61_N$), 3) quickly detects the level of the regenerative current flowing through the circulation circuits 61 ($61_A$ to $61_N$) by regenerative current detection circuits 62 ($62_A$ to $62_N$) and supplies it to control circuits 63 ($63_A$ to $63_N$), and 4) controls the switching of the switches SW ($SW_A$ to $SW_N$) by the control circuits 63 ($63_A$ to $63_N$) based on the level of the regenerative current.

Furthermore, the range of the circuit to be incorporated into the monolithic IC is arbitrary.

INDUSTRIAL APPLICABILITY

The present invention is applicable to an industrial field in which a solenoid is used.

This application is based on Japanese Patent Application No. 2001-23462 filed on Apr. 20, 2001, of which specification, claims, and drawings are incorporated in this specification in its entirety by reference.

The invention claimed is:

1. A solenoid drive device comprising:
   a solenoid (30) whose one end is connected to a ground;
   a switching element (33, SW) which is connected between the other end of said solenoid and a power source, and switches on/off a current path between said solenoid and said power source;
   a regenerative circuit (34, 32, 61) which is connected between the ground and the other end of said solenoid, and flows a current generated by a counterelectromotive force generated at said solenoid when said switching element is switched off;
   a sample hold circuit (35, 36, 62) which samples and holds a signal representing a level of a current flowing through said regenerative circuit when said switching element is switched off, and outputs the signal as a current detection signal;
   a control circuit which controls a timing for switching on/off said switching element based on the current detection signal from said sample hold circuit; and
   a computing circuit (38) which sets, based on a length of a period during which said switching element is switched on, a timing at which said sample hold circuit should carry out said sampling in a term, occurring immediately after the period, during which said switching element is switched off,
wherein said control circuit, each time the current detection signal is supplied from said sample hold circuit, adjusts the length of the period during which said switching element is switched on, such that the current detection signal supplied from said sample hold circuit becomes constant.

2. The solenoid drive device according to claim 1, wherein:
said regenerative circuit comprises:
a flywheel diode (34) which allows the current generated by the conterelectromotive force generated at said solenoid to flow therethrough, and which, when said switching element is switched on, prevents a current for driving said solenoid from flowing to said regenerative circuit when said switching element is switched on, and
a resistor (32) which is serially connected to said flywheel diode; and
said sample hold circuit (35, 36, 62) samples a voltage drop caused at said resistor by a current flowing through said resistor, and holds and outputs the sampled voltage.

3. The solenoid drive device according to claim 1:
wherein said regenerative circuit comprises a flywheel diode (34) whose anode is connected to a ground, and a resistor (32) whose one end is connected to a cathode of said flywheel diode and whose other end is connected to said switching element and the one end of said solenoid.

4. The solenoid drive device according to claim 1, wherein said ground (G) comprises frame grounds which are mutually connected via a frame of a device.

5. The solenoid drive device according to claim 1, wherein said sample hold circuit:(i) carries out sampling of the signal representing the level of the current when said switching element is switched off, and (ii) holds and outputs the sampled signal as the current detection signal that represents a current flowing through said solenoid, while not performing the sampling, in a period during which said switching element is switched.

6. The solenoid drive device according to claim 1, wherein said sample hold circuit and said control circuit do not comprise a circuit for smoothing a waveform of the current detection signal.

7. The solenoid drive device according to claim 1, wherein:
said control circuit repeats a cycle constituted by switching on and switching off of the current path by said switching element;
said sample hold circuit detects a level of a regenerative current in each cycle; and
said control circuit controls switching on and switching off of said switching element in a next cycle, by using the detected level.

8. The solenoid drive device according to claim 1, wherein:
said control circuit repeats a cycle constituted by switching on and switching off of the current path by said switching element; and
said computing circuit determines as a timing for sampling, a timing after lapse of a predetermined time after that said switching element is switched off based on a timing for switching on/off said switching element in the next cycle, and outputs the timing for sampling to said sample hold circuit.

9. The solenoid drive device according to claim 1, wherein said control circuit comprises any of a pulse width control circuit (37, 39) which adjusts a length of a period during which said switching element is switched on or a term during which said switching element is switched off based on the current detection signal, a duty ratio control circuit (37, 39) which adjusts a ratio of a period during which said switching element is switched on and a term during which said switching element is switched off, and a frequency control circuit which adjusts a frequency of switching on and switching off of said switching element.

10. The solenoid drive device according to claim 1, wherein said switching element (33, SW), said regenerative circuit (34, 32, 61), said sample hold circuit (35, 36, 62), said control circuit (37, 39), and said computing circuit are incorporated into a monolithic IC having a ground terminal.

11. A solenoid drive device comprising:
a frame (51) which is made of a material through which a current flows;
a plurality of solenoids (30) one end of each of which is connected to said frame;
a plurality of switches (SW) each of which is connected between an other end of each of said solenoids and a power source, and switches on/off a current path between a corresponding solenoid and said power source;
a plurality of regenerative circuits (34, 32, 61) each of which is connected between the ground and the other end of each of said solenoids, and flows a current generated by a counterelectromotive force generated at said corresponding solenoid when each of said switching element is switched off;
a plurality of sample hold circuits (35, 36, 62) each of which samples and holds a signal representing a level of a current flowing through said each of regenerative circuits when said switching element is switched off, and outputs the signal as a current detection signal;
a plurality of control circuits each of which controls a timing for switching on/off said switching element based on the current detection signal from said plurality of sample hold circuits; and
a computing circuit (38) which sets, based on a length of a period during which said switching element is switched on, a timing at which said plurality of sample hold circuits should carry out said sampling in a term, occurring immediately after the period, during which said switching element is switched off,
wherein each of said plurality of control circuits, each time the current detection signal is supplied from said plurality of sample hold circuits, adjusts the length of a period during which said switching element is switched on, such that the current detection signal supplied from said plurality of sample hold circuits becomes constant.

12. A solenoid drive method comprising:
connecting one end of each of a solenoid (30) to a ground;
connecting a switching element (33, SW) between an other end of said solenoid and a power source, the switching element switching on/off a current path between said solenoid and said power source;
connecting a regenerative circuit (34, 32, 61) between the ground and the other end of said solenoid, the regenerative circuit flowing a current generated by a counterelectromotive force generated at said solenoid when said switching element is switched off;
sampling and holding, and outputting as a current detection signal, a signal representing a level of a current flowing through said regenerative circuit when said switching element is switched off, the step of sampling and holding being carried out by a sample hold circuit (35, 36, 62);

controlling a timing for switching on/off said switching element based on the current detection signal from said each sample hold circuit; and computing, based on a length of a period during which said switching element is switched on, a timing at which said sampling is carried out in a term occurring immediately after the period during which said switching element is switched off, wherein said control circuit, each time the current detection signal is supplied from said sample hold circuit, adjusts the length of a period during which said switching element is switched on, such that the current detection signal supplied from said sample hold circuit becomes constant.

* * * * *